United States Patent [19]

Levkoff et al.

[11] 4,195,963
[45] Apr. 1, 1980

[54] LOADING PLATFORM AND METHOD FOR TRANSFERRING SHEETS OF MATERIAL

[75] Inventors: Henry S. Levkoff, Old Westbury; Alphonse Falco, Rosedale, both of N.Y.

[73] Assignee: Standard Folding Cartons, Inc., Jackson Heights, N.Y.

[21] Appl. No.: 908,682

[22] Filed: May 23, 1978

[51] Int. Cl.$^2$ .............................................. B65G 61/00
[52] U.S. Cl. ..................................... 414/786; 108/53.5; 206/386; 414/45; 414/391; 414/399; 414/608
[58] Field of Search ..................... 214/15, 10.5 R, 6 P, 214/38 CC, 152, 621; 108/51.1, 53.1, 53.3, 53.5, 56.3; 206/386, 595, 598, 600; 414/45, 391, 399, 608, 786

[56] References Cited

U.S. PATENT DOCUMENTS

| | | | |
|---|---|---|---|
| 1,510,530 | 10/1924 | White et al. | 214/38 CC |
| 2,503,022 | 4/1950 | Benoist et al. | 108/51.1 |
| 2,509,682 | 5/1950 | Golrick | 214/38 CC X |
| 2,808,157 | 10/1957 | Terrill | 214/10.5 R X |
| 3,783,800 | 1/1974 | Bucker | 108/53.5 |

FOREIGN PATENT DOCUMENTS 711071  6/1954  United Kingdom ................ 108/53.5

*Primary Examiner*—L. J. Paperner
*Attorney, Agent, or Firm*—Pennie & Edmonds

[57] ABSTRACT

An improved method and apparatus for transferring a load such as a stack of cardboard sheets from an aerator to the receiving end of a cutting press. Sheets of material are stacked on a first pallet having a plurality of spaced support members defining a fork-like configuration having an elongated passage between each pair of spaced supports. The free ends of the spaced supports are adapted for common connection to a transverse rod to provide a generally rigid support surface defined by the spaced supports. The pallet is transported with the stack loaded on its support surface by a forklift to a predetermined location above a movable base pallet which is adapted to align the first pallet in superposed relation thereupon as the first pallet is lowered in place. The base pallet includes a plurality of spaced supports corresponding to the spaced supports of the first pallet. After the two pallets become engaged, the connecting rod of the first pallet is removed. The pallets are then moved to the receiving end of the cutting press. The press is provided with a lifting mechanism which includes a plurality of lifters that can be elevated vertically through the passages defined by adjacent pairs of the spaced supports of the pair of engaged pallets to effect vertical transfer of the stack from the pallets onto the lifters. The lifters are elevated intermediate the aligned supports to a predetermined height so that the stack is raised by the lifters a distance sufficient to permit the engaged pair of pallets to be withdrawn.

11 Claims, 9 Drawing Figures

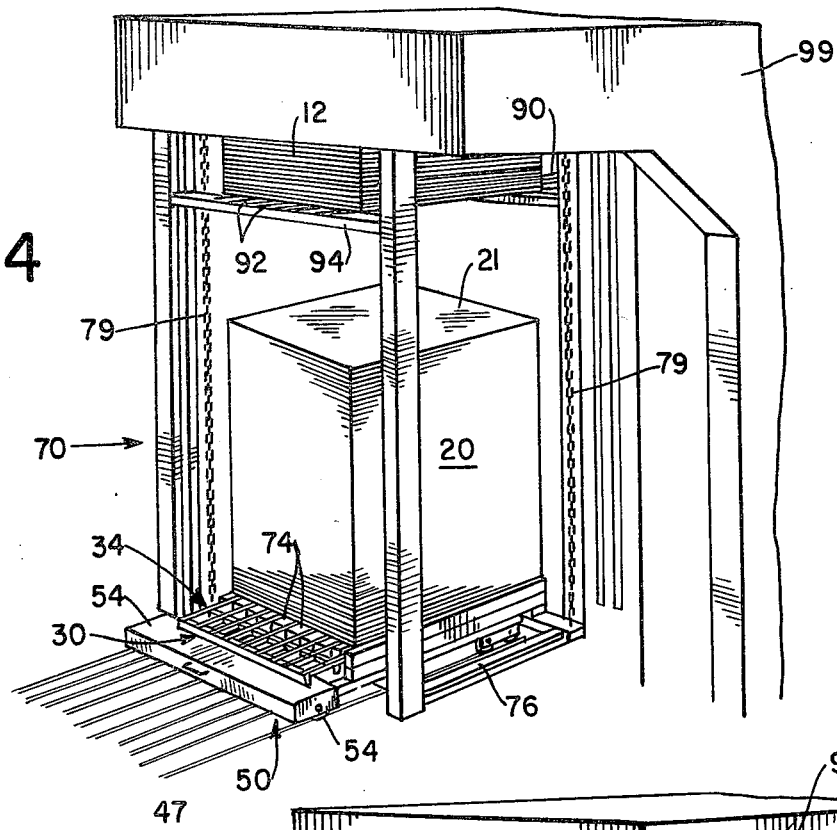
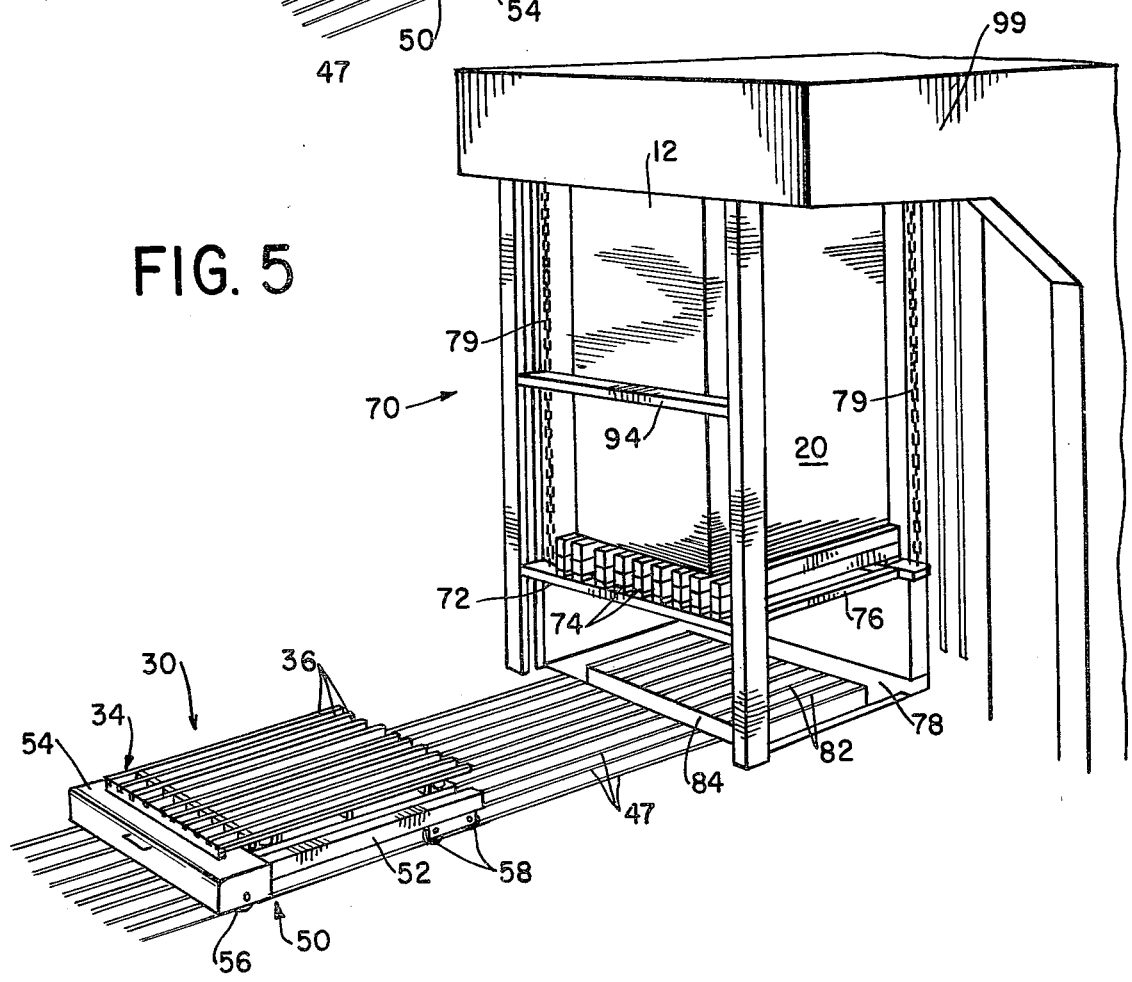

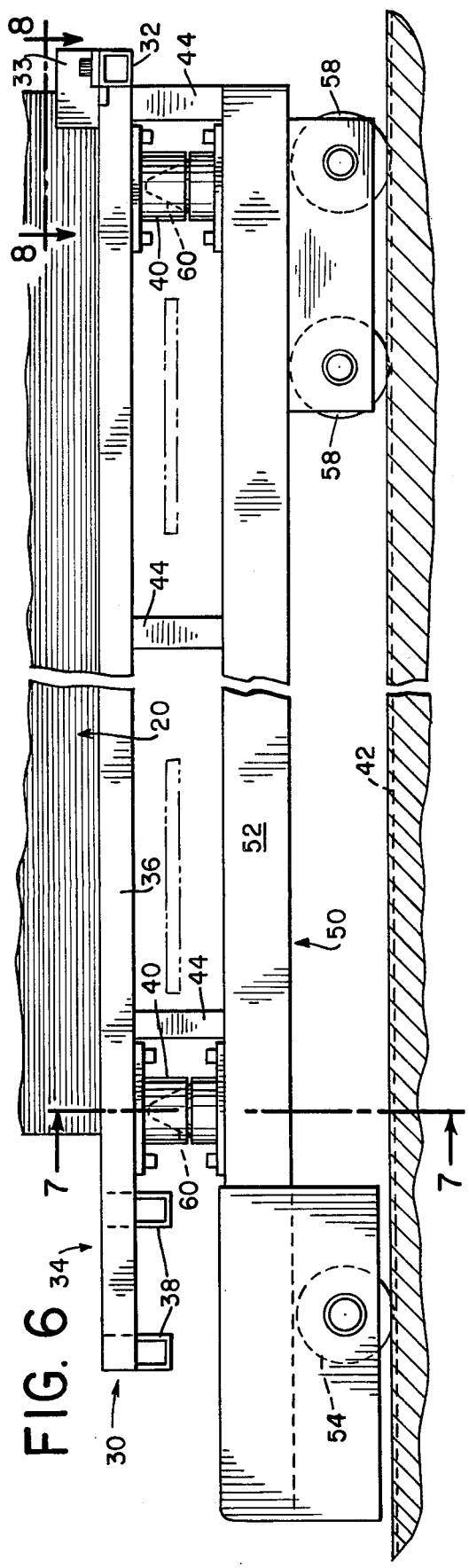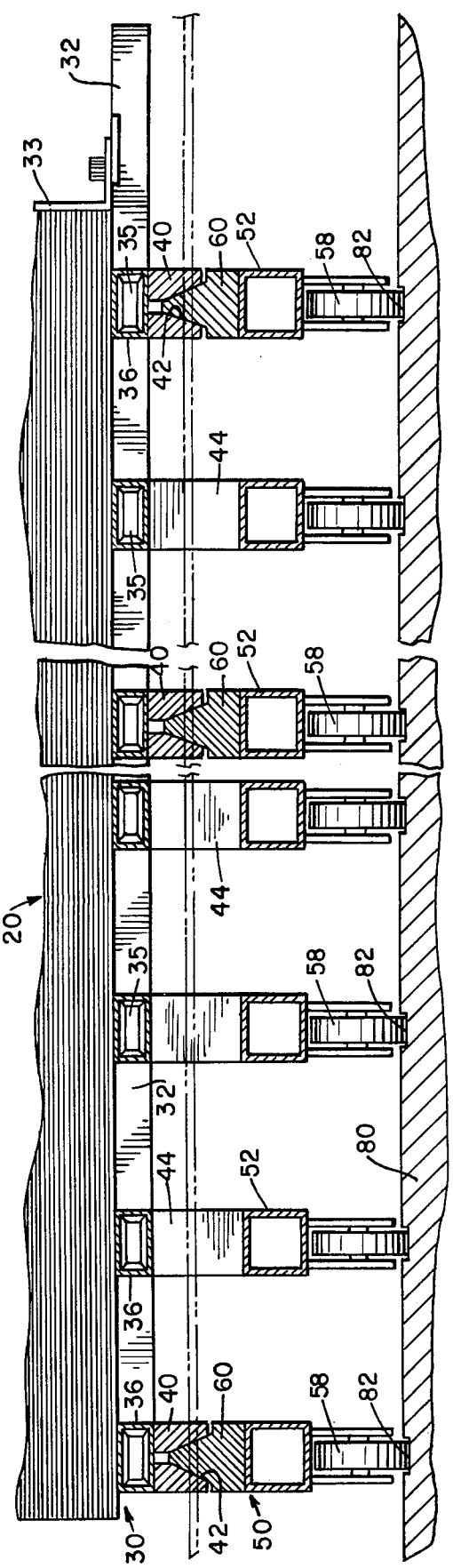

LOADING PLATFORM AND METHOD FOR TRANSFERRING SHEETS OF MATERIAL

BACKGROUND OF THE INVENTION

1. Field of the Invention

The invention relates to improvements in a method for transferring a stack of sheets of material from an aerator to the receiving end of a cutting and creasing press and to apparatus therefor which eliminates the need for restacking the sheets of material during the course of the transfer.

2. Description of the Prior Art

Sheets of material such as cardboard for use in fabricating paper containers are printed on a press and stacked horizontally in single sheets one on top of another until a convenient height is obtained. The stack is subsequently transferred to a cutting and creasing press. Such stacks are typically accumulated on a wooden slatted pallet of the common type which has at least one flat load supporting surface adapted for convenient transportation by a forklift.

Typically, before such a stack of printed sheets is ready to be fed into a cutting and creasing press, it is common practice to transfer the stack of sheets into an aerator, also referred to as a pile turner. In the pile turner, the stack is deposited on a support in a horizontal position. The pile turner then rotates the entire stack to a vertical orientation. A jet of air is then directed among the sheets to separate the sheets to aid in aligning the stack and aid in the removal of powder from the inked surface used in the printing process. The aerated sheets of material are then rotated again so they are stacked horizontally on one of the wooden pallets. The stack of sheets may be temporarily stored on the wooden pallet. Eventually the stack is transported to a loading pallet adjacent the receiving end of a cutting and creasing press.

In the prior art the stack of sheets had to be removed from the transport pallet and restacked onto the loading pallet before the loading pallet could be rolled into the receiving end of the press since only the loading pallet could be accommodated by the lifters provided at the loading end of the press.

SUMMARY OF THE INVENTION

We have invented a method for transferring a stack of sheets of material from a first supply position such as an aerator remote from an associated stamping apparatus such as a cutting and creasing press to a second discharge position. At the discharge position, the stack may be elevated by lifting means of the associated stamping apparatus. The inventive method obviates the need to restack the sheets during the course of the transfer. The steps of the method comprise positioning a stack of sheets on the support surface of an upper pallet. The upper pallet includes a plurality of generally parallel spaced support members connected at one end. The free ends of the support members of the upper pallet may be connected by connecting means. The method further comprises transporting the upper pallet with the stack of sheets supported thereon to a location generally above a movable base support pallet. The base support pallet has an upper surface portion adapted to support said upper pallet, and including a plurality of generally parallel spaced support members connected at one end. The upper pallet is then lowered onto the base pallet, and the connecting means removed. Transporting the stack of sheets supported on the upper pallet can then take place by moving the base pallet to the second position for lifting of the stack off the upper pallet by lifters of the associated stamping apparatus.

We have also invented a loading platform to carry out the method. The loading platform comprises a first movable base pallet having a fork-like configuration including a forward portion and a rearward portion. The forward portion includes a plurality of generally parallel elongated supports projecting in spaced relation transversely of said forward portion. Adjacent pairs of the supports define an elongated passage therebetween. The loading platform further comprises a second upper pallet removably supportable on said base pallet having an elongated first portion and a second portion including a plurality of elongated spaced support members projecting from said first portion. The plurality of spaced support members define a surface adapted to support a load thereon and are arranged for alignment with the support members of the base pallet, such that each of said support members is supported lengthwise above one of said supports of said base pallet. The loading platform further comprises means for aligning the upper pallet in superposed relation atop the base pallet.

In a preferred embodiment the upper pallet includes means for aligning the upper pallet in superposed relation atop the base pallet and means for connecting the free ends of its spaced support members.

BRIEF DESCRIPTION OF THE DRAWINGS

FIG. 4 is a perspective view of the embodiment of FIG. 3 illustrating a new load at the receiving end of a press beneath an old load;

FIG. 5 is a perspective view of the embodiment of FIG. 3 illustrating the new load supported by the lifters of the press and the inventive apparatus withdrawn from the receiving end of the press;

FIG. 6 is a fragmentary side elevation of the present inventive apparatus;

FIG. 7 is a fragmentary section taken along line 7—7 of FIG. 6;

DETAILED DESCRIPTION OF THE PREFERRED EMBODIMENTS

Figure 1:
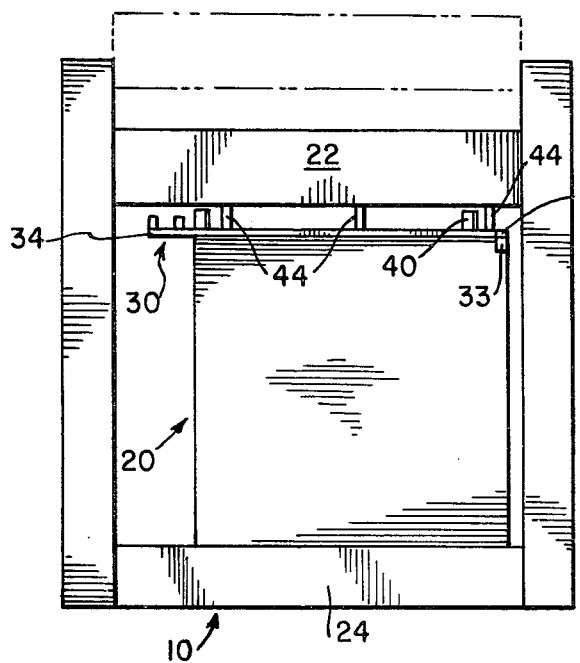
FIG. 1 is a front elevation illustrating the upper pallet and connecting rod of the present invention placed inverted on top of a stack of sheets of material in an aerator.

FIG. 1 illustrates printed cardboard sheets horizontally stacked in a pile turner designated generally as 10 and an upper pallet 30 placed in inverted position on top of the stack of sheets 20. An elongated connection rod 32 is shown attached to the upper pallet 30. A retractable arm 22 of the pile turner 10 is shown in a closed position constricting the upper pallet 30 and the stack 20 in preparation for rotation of the stack 20 and the upper pallet 30.

Figure 2:
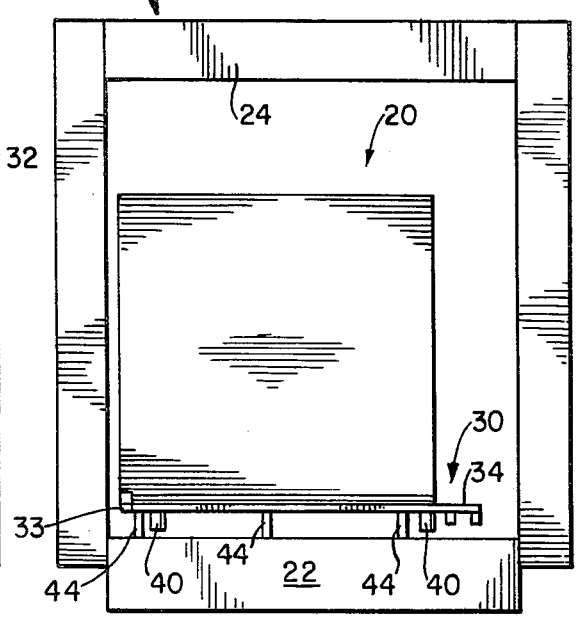
FIG. 2 is a front elevation of the embodiment of FIG. 1 showing the upper pallet and connecting rod in upright position supporting a stack of sheets of material.

FIG. 2 illustrates the upper pallet 30 and stack 20 after inversion in the pile turner 10 so that the upper pallet 30 is right-side up and the stack 20 of cardboard sheets is shown supported thereon. The retractable arm 22 of the pile turner 10 is shown in an open position to permit removal of the upper pallet 30 and the stack 20.

Figure 3:
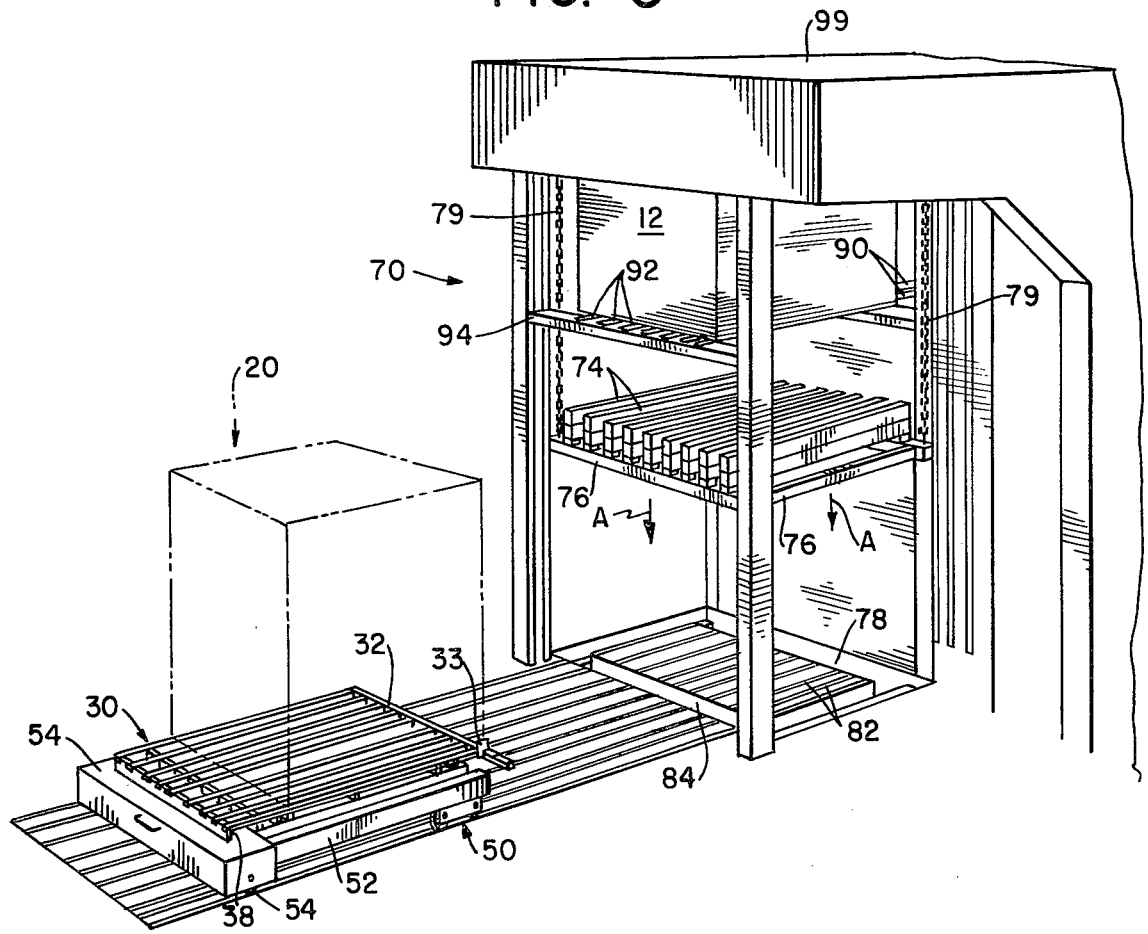
FIG. 3 is a diagrammatic perspective view of the present invention and the receiving end of an associated cutting and creasing press.

FIG. 3 illustrates the upper pallet 30 supported on top of a base pallet 50 which is located adjacent the receiving end 70 of an associated cutting and creasing press 99, a portion of which is shown diagrammatically. Before the base pallet 50 is moved into the receiving end 70 of the press 99, the connecting rod 32 must be removed and a lifting mechanism 72 of the press 99 lowered, as indicated by arrows A. Lifting mechanism 72 includes a plurality of lateral lifters 74 supported by a rectangular frame 76 which fits about a sunken region 78 which defines the perimeter of a rectangular platform 80 located at the receiving end 70 of the press 99. The frame 76 is hoisted and lowered by a set of four chains 79 (only two shown). The platform has a plurality of lateral channels 82 to accommodate the lifters 74 when they are lowered into the sunken region 78.

FIG. 3 further illustrates in diagrammatic fashion the remaining portion of a partially depleted old stack 12 supported on a plurality of flat blades 90. The free end 92 of each blade 90 is supported on a common crossbar 94. The old stack 12 is raised so that the uppermost sheet thereof may be individually and successively raised into feeding position for removal by suction means (not shown) which are provided on the cutting and creasing press 99.

FIG. 4 diagrammatically illustrates the base pallet 50 with the upper pallet 30 and stack 20 moved into the receiving end 70 of the press 99. After the stack 20 has been moved into this location, the frame 76 is elevated a short distance sufficient to permit lifters 74 to raise the stack 20 from the upper pallet 30 to permit withdrawal of the upper and base pallets 30, 50. Once the pallets are withdrawn as shown in FIG. 5, the frame 76 may be further elevated.

FIG. 5 illustrates the new stack 20 shown in FIG. 4 supported on the lifters 74 of the press 99 after the lifters 74 have been elevated to raise the new stack 20 directly beneath the remainder of the partially depleted old stack 12. The sequence in FIG. 5 also shows the base pallet 50 with the upper pallet 30 supported thereon after they have been withdrawn from the receiving end 70 of the press 99. Additionally, after the new stack 20 is raised sufficiently to contact the underside of the blades 90 which are supporting the old stack 12, as shown in FIG. 4, the blades 90 are retracted and the crossbar 94 which supported the free end 92 of each blade 90 is lowered to a predetermined location corresponding to the position to which the blades 90 will once again extend when the new stack 20 is sufficiently raised and depleted to permit the repetition of the sequence illustrated in FIG. 4.

FIG. 6 is a side elevation of the base pallet 50 with the upper pallet 30 supported on top thereon and aligned therewith.

The base pallet 50 includes a forward end 54 from which a plurality of parallel spaced supports 52 perpendicularly project. The forward end 54 houses a plurality of single wheels 56, one associated with each support 52. For each single wheel 56 there is also a double wheel 58 located beneath each support member 52 at the free end thereof. The two wheels of each double wheel 58 are sufficiently spaced to permit the base pallet 50 to span the forward recess 84 of the sunken perimeter 78 about the platform 80 at the receiving end 70 of the press 99. Wheels 56 and 58 are disposed in track 47 for moving the base pallet 50 into the receiving end 70 of the press 99.

On top of a selected number of support members 52 there is mounted a pair of spaced cones 60 which assist in the alignment of the upper pallet 30 when the upper pallet 30 is to be lowered onto the base pallet 50.

The upper pallet 30 includes a front portion 34 including a pair of parallel, preferably hollow, aluminum ribs 36. Across the pair of aluminum ribs 36, a plurality of parallel spaced supports 38 project transversely. The supports 38 are preferably hollow and lightweight and accordingly are preferably aluminum.

On the underside of the upper pallet 30 there is provided a plurality of cylindrical sockets 40 each of which has a conical recess 42 for mating engagement with one of the cones 60 of the base pallet 50. For each cone 60 of the base pallet 50 there is a corresponding socket 40 mounted on the underside of the upper pallet 30. Each slatted support 38 of the upper pallet 30 is also provided with three vertical legs 44 which may similarly be fabricated of aluminum sheeting. The legs 44 serve to support the upper pallet 30 with sufficient elevation from a floor surface so that the upper pallet 30 may be easily lifted for transportation by tines of a standard fork lift truck. The height of each leg 44 is equivalent to the distance beween the underside of the upper pallet 30 and the upper surface of the base pallet 50 when the sockets 40 of the upper pallet 30 are resting on the cones 60 of the base pallet 50. The elongated connecting rod 32 shown in mating engagement connected to the free ends 39 of the slatted supports 38 of the upper pallet 30 is discussed in greater detail below.

FIG. 7 is a sectional view showing the upper pallet 30 which is supported by the base pallet 50. Since it is desirable to make the upper pallet 30 lightweight for handling purposes, the attachment of the connecting rod 32 provides added structural stability advantageous in the transfer of a load on the upper pallet 30 by a fork lift. After the upper pallet 30 is aligned and lower in engaged relation on the top of the base pallet 50, the connecting rod 32 may be easily and quickly removed, for example, by a rubber hammer (not shown). In any event, if a connecting rod 32 is used, it must be removed before the load is rolled into the receiving end 70 of the cutting and creasing press 99 since the vertical space or passage between each pair of adjacent slatted members of the pallets must be unobstructed to permit the lifters 74 of the press 99 to be elevated to remove the load from the pallets.

The connecting rod 32 is further provided with an adjustable right angle alignment bar 33 or square illustrated in greater detail in FIG. 8 and further discussed below in connection therewith.

FIG. 7 also illustrates diagrammatically a plurality of slots 48 of track 47 in which each set of three vertically aligned wheels travel.

Figure 8:
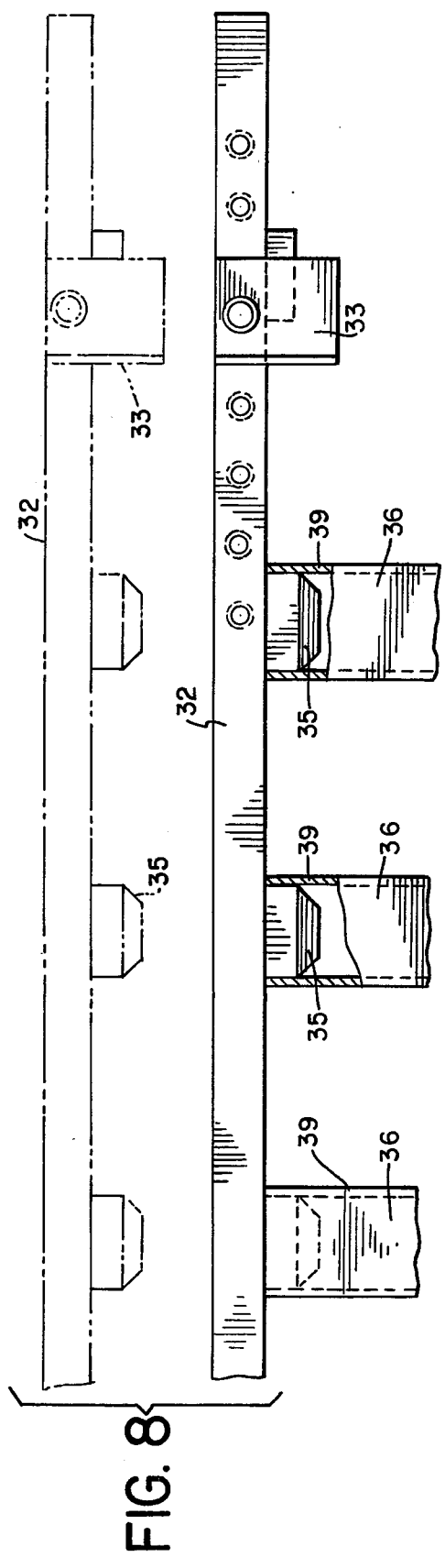
FIG. 8 is a fragmentary section taken along line 8—8 of FIG. 6.

FIG. 8 diagrammatically illustrates a portion of the elongated connecting rod 32 shown attached to the free ends 39 of the slatted supports 38 of the upper pallet 30. The connecting rod 32 has a plurality of rectangular tapered projections 35 which may be aligned for pressing engagement into the free ends 39 of the hollow slatted supports 38 of the upper pallet 30. FIG. 8 further illustrates in greater detail the adjustable feature of the alignment bar 33 which may be mounted at preselected locations by well-known convenient methods of attachment to accommodate variations in width from one stack to another.

Figure 9:
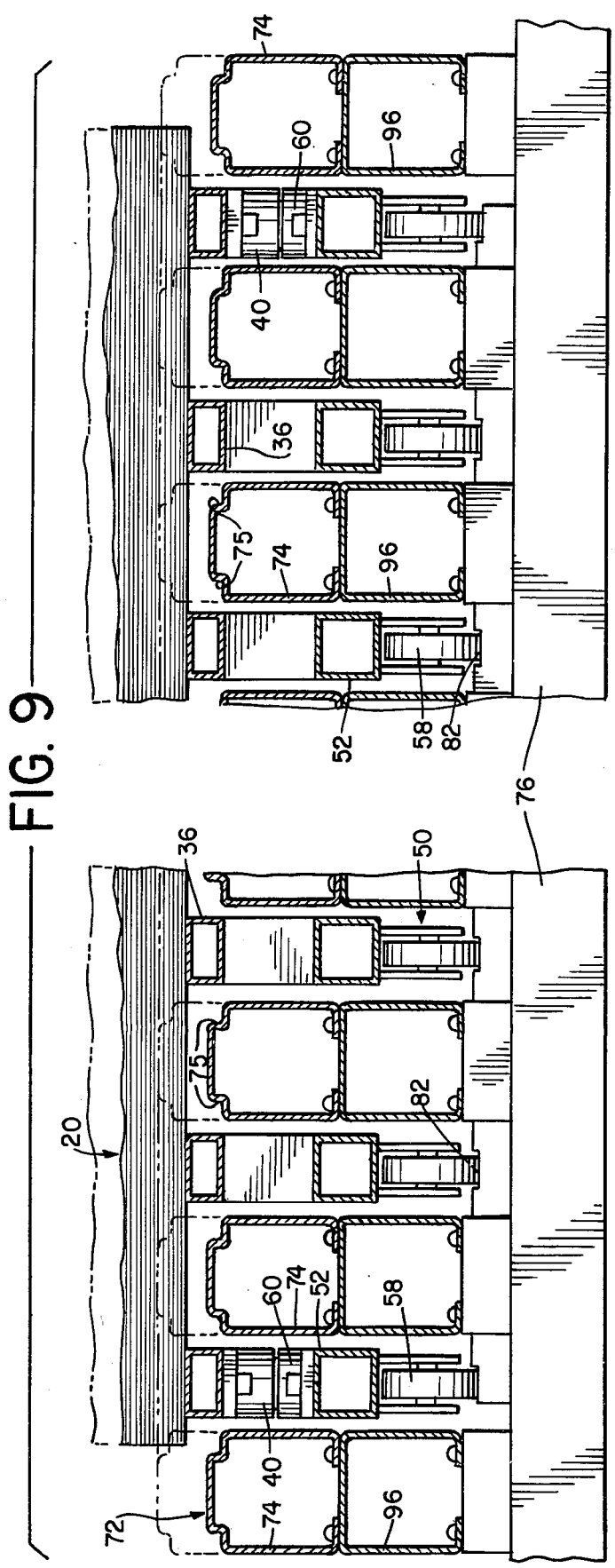
FIG. 9 is a fragmentary section taken generally along line 9—9 of FIG. 4 showing the interrelationship of the inventive apparatus of the lifters of the associated press.

FIG. 9 is a partial diagrammatic illustration showing the pallets 30,50 in the receiving end 70 of the press 99. In this position, the lifters 74 may be elevated to lift the stack 20 from the supported surface of the upper pallet 30. After the lifters 74 are elevated to an intermediate location indicated by the phantom lines, the pallets 30,50 are withdrawn to permit the lifters 74 to be further elevated until the foremost sheet 21 of the cardboard of the stack 20 is raised into a predetermined position to be fed into the cutting and creasing press 99.

The top of each lifter 74 is notched at either end 75 so that a pair of adjacent lifters 74 may accommodate and temporarily support one of the flat blades 90. The plurality of such flat blades 90 extends rearwardly from the press when the bottom of a stack reaches a predetermined height as shown in FIG. 3. After the blades 90 are fully extended, their free ends 92 are supported by the solid crossbar 94 so as to permit the lifters 74 to be lowered to accept a new stack of sheets. The blades 90 together with the crossbar 94 continue to be raised for continuous feeding of sheets as shown in FIG. 4. After a new stack is elevated in contact with the bottom of an old stack, as shown in FIG. 5, the blades 90 are retracted and the crossbar 94 returns to assume its lowered position as shown in FIG. 5.

The height of each lifter 74 is determined by brackets 96 which accommodate the added height of the upper pallet 30 positioned on top of the base pallet 50.

We claim:
1. A loading platform which comprises:
   (a) a movable base pallet having a fork configuration including a forward portion and a rearward portion, said rearward portion including a plurality of generally parallel elongated supports projecting in spaced relation transversely of said forward portion, adjacent pairs of said supports defining an elongated passage therebetween;
   (b) an upper pallet removably supportable on said base pallet having a fork configuration including an elongated first portion and a second portion including a plurality of generally parallel elongated spaced support members projecting from said first portion, said plurality of support members defining a surface adapted to support a load thereon and arranged for alignment with said support members of said base pallet;
   (c) means for aligning said upper pallet in superposed relation atop said base pallet such that each of the support members is supported lengthwise above one of said supports of said base pallet, said aligning means comprises:
      (1) a plurality of plugs having at least a portion defining a generally conical configuration mounted in spaced locations in upright relation of said movable base pallet, and
      (2) a plurality of socket members facing downwardly from said upper pallet, each of said socket members defining a conical recess configured and dimensioned to matingly engage one of said conical plugs, said socket member arranged to correspond to the locations of said plugs so as to permit said upper pallet to rest upon said base pallet in aligned relation;
   (d) a plurality of spaced apart legs projecting downwardly from the support members of the upper pallet generally parallel to said socket members of said upper pallet; and
   (e) means for connecting the free ends of the spaced support members of said upper pallet, said connecting means comprising an elongated rod member having a plurality of projections for individually engaging the free ends of the support members of said upper pallet.

2. The loading platform according to claim 1 wherein said upper pallet is generally lightweight relative to the base pallet.

3. The loading platform according to claim 2 wherein said upper pallet is made of aluminum.

4. The loading platform according to claim 1 wherein:
   (a) at least the free end of one of said support members of said upper pallet has a hollow portion; and
   (b) said projections of said elongated rod member are adapted to fit snugly within the free ends of said support members of said upper pallet.

5. The loading platform according to claim 1 wherein said connecting means further comprises an adjustable square for aligning a corner of the load positioned on the upper pallet.

6. A loading platform for transporting sheets of material which comprises: porting sheets of material which comprises:
   (a) a base pallet movable between a load position and a discharge position, said base pallet including a forward portion and a rearward portion, said rearward portion having a plurality of generally parallel spaced apart supports projecting generally transversely of said forward portion;
   (b) an upper pallet removably supportable on said base pallet having an upper surface portion for supporting a load such as a stack of sheets of material, said upper pallet including:
      (1) a plurality of generally parallel spaced support members arranged in a fork configuration, each of said support members arranged to rest upon one of said spaced support members of said base pallet as said base pallet is moved between the load position and the discharge position;
   (c) means for removably connecting the free ends of said generally parallel spaced support members of said upper pallet to provide a generally rigid structure thereto; and
   (d) means on the underside of said upper pallet and on the upper surface of said base pallet for aligning upper pallet in superposed relation atop said base pallet.

7. The loading pallet according to claim 6 wherein said aligning means comprises:
   (a) a plurality of cones mounted in spaced locations in upright relation on said first movable base pallet; and
   (b) a plurality of sockets facing downward from the underside of said second pallet, each of said sockets defining a conical recess configured and dimensioned to matingly engage one of said cones, each of said sockets arranged in locations corresponding to the position of one of said cones so as to permit said upper pallet to rest upon said base pallet.

8. The loading pallet according to claim 7 wherein said upper pallet further comprises a plurality of spaced apart legs projecting downward from said support members generally parallel to said sockets of said upper pallet.

9. The loading pallet according to claim 8 wherein said connecting means comprises an elongated rod having a plurality of projections for individually engaging the free ends of the support members of said upper pallet.

10. A method for transferring sheets of material such as cardboard from a first supply position to a second transfer position for elevation by forklifts of an associated apparatus comprising:
   (a) positioning a stack of sheets on the support surface of a first pallet, said first pallet including a plurality of generally parallel spaced support members connected at one end portion;
   (b) transporting said first pallet with the stack of sheets supported thereon to a location generally above a second support pallet which is disposed adjacent said associated apparatus, said second pallet having an upper surface portion adapted to support said first pallet, said second pallet including a plurality of generally parallel spaced support members connected at one end;
   (c) lowering said first pallet in superposed aligned relation on said second pallet so that each of said spaced support members of said first pallet is supported lengthwise on one of said spaced support members of said second pallet; and
   (d) moving said stack of sheets supported on said first pallet and said second pallet to said transfer position.

11. The method according to claim 10 further comprising:
   (a) connecting the free ends of said support members of said first pallet by connecting means before transporting said first pallet; and
   (b) removing said connecting means from said first pallet after said first pallet is lowered onto said second pallet.

* * * * *